Patented Feb. 17, 1925.

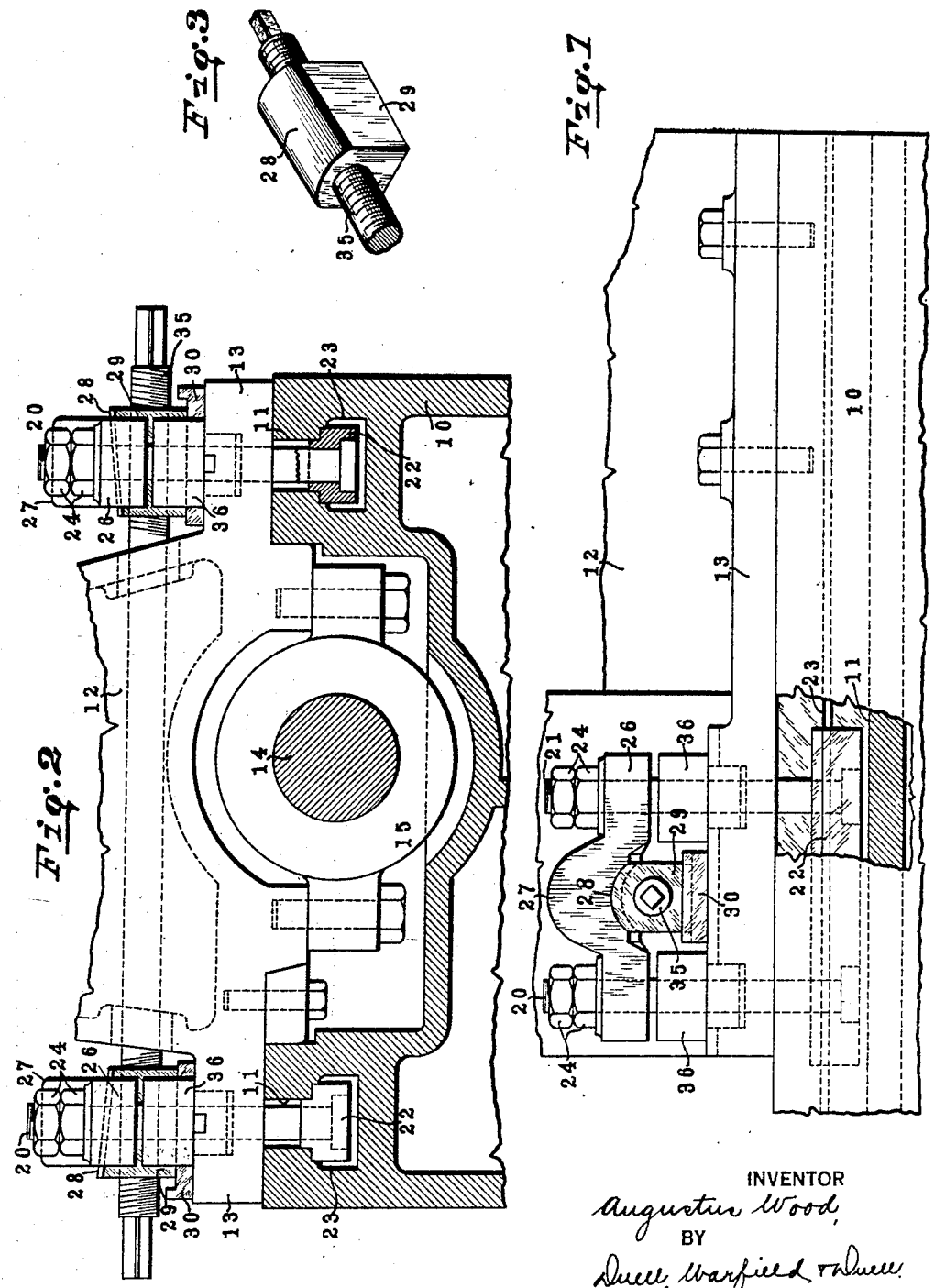

1,526,575

UNITED STATES PATENT OFFICE.

AUGUSTUS WOOD, OF FITCHBURG, MASSACHUSETTS, ASSIGNOR TO MANNING MAXWELL & MOORE, INC., OF NEW YORK, N. Y., A CORPORATION OF NEW JERSEY.

CLAMP FOR TAIL OR HEAD STOCKS.

Application filed April 18, 1922. Serial No. 554,881.

*To all whom it may concern:*

Be it known that I, AUGUSTUS WOOD, a citizen of the United States, residing at Fitchburg, in the county of Worcester and State of Massachusetts, have invented certain new and useful Improvements in Clamps for Tail or Head Stocks, of which the following is a full, clear, and exact description, such as will enable other skilled in the art to which it appertains to make and use the same.

This invention relates to machine tools, and more particularly to the clamping mechanism for clamping head-stocks, tail-stocks, etc., in place on lathe type machine tools.

This invention has for its general object an improved construction and arrangement of parts which is durable, efficient, accessible, and readily manufactured.

A more specific object is to provide an improved clamping mechanism adapted to be quickly applied or released in such a way that the tension on the clamping means shall be substantially equalized not only on each side of the head stock or tail stock to be clamped but also across the same on both sides, and to provide improvements in the details of the pressure exerting means for accomplishing this result.

For a more complete understanding of the nature and advantages of this invention reference should be had to the following detailed description, which describes the best illustrative embodiments of this invention at present known to me, taken in connection with the accompanying drawing in which:

Figure 1 is a fragmentary view, mainly in side elevation, showing the bed of a lathe type machine tool having a movable part, such as a tail-stock, provided with a clamping mechanism in accordance with this invention.

Figure 2 is a view mainly in vertical section taken on a plane transverse to Fig. 1 showing more clearly the clamping mechanism for the tail-stock.

Figure 3 is a perspective view showing the details of the wedge employed in a clamping mechanism.

Referring now to the drawing, 10 denotes the bed of a lathe type of machine tool which has parallel horizontally disposed ways 11 on which the tail-stock, head-stock, etc., are adapted to slide, or be moved. For purposes of illustration a movable tail-stock is shown at 12, which for purposes of generality is hereinafter referred to as the slidable part. This part has projecting ledges 13 which are adapted to rest and slide upon the ways 11. In large lathes, such as this invention is particularly applicable to, positive means are advantageously employed for sliding the slidable part 12. Such means are here illustrated as comprising a screw 14 engaging with a nut formation 15 secured to the bottom of the slidable part 12.

The clamping mechanism for causing the lower surface of the ledge 13 to engage frictionally with the surface of the ways 11 comprises a pair of bolts 20 and 21, projecting up from and secured in a block 22 which is adapted to slide in a slot 23 formed in ways 11. Holes are provided in the ledges 13 through which the bolts 20 and 21 project. These bolts have threaded upper portions adapted to receive nuts 24 by which tension may be applied through drawing them up by a wrench in the ordinary manner. These nuts 24 however, according to the practice of this invention, once having been drawn into place, are not further manipulated; the tension control being accomplished by the aid of ancillary means.

The ancillary means for releasing or applying tension to these bolts on each side of the machine, is adapted to function positively and apply tension simultaneously in equal amounts through a saddle member 26, which is perforated at its ends to fit down over the bolts 20 and 21, its ends serving as washers against which the nuts 24 react. The central portion of this saddle member is arched as at 27 and is adapted to ride upon and react against the upwardly curved surface 28 of the tension wedges 29.

The wedges 29 are preferably formed to have their curved upper inclined surface generally cylindrical in contour. The lower surface of these wedges is preferably plane and adapted to slide on a keeper 30 disposed on the ledge 13 between the bolts 20 and 21. The wedges and saddle member 26 are so designed that the upward component of the thrust of the wedge, when moving inward, is applied to substantially the central point of the saddle member 26; thereby providing for the application of substantially equal tensions to each of the pair of bolts 20 and 21 by the movement of the wedge upon the keeper 30.

As shown in Fig. 2, the wedges 29 preferably have their convex surfaces each slanting inwardly. Positive means are provided for moving both wedges inwardly toward, or outwardly from the slidable part 12, in order simultaneously to apply or release tension on the bolts 20 and 21 at both the front and the rear of the machine. This positive movement of the wedges is secured by means of a shaft 35 having portions threaded in opposite directions at each end thereof, as for instance one end is in a right hand direction while the other is in a left hand direction. The wedges 29 are bored out and have internal threads adapted to co-operate with the threaded portions on the two ends on the shaft 35. The tip of each end of the shaft 35 is squared, or otherwise formed in order to receive a wrench or other tool for rotating the same. Collars shown at 36 are preferably slipped over the bolts 20 and 21 between the saddle member 26 and the ledge 13.

In operation, the slidable part 12 may be clamped to the ways 11 of the machine, when equipped with this invention, by applying a wrench to the end of shaft 35 and rotating it so as to draw the wedges 29 together. In this way equal tensions are simultaneously applied to the bolts 20 and 21 on the front and rear side of the machine shown, inasmuch as each wedge 29 is forced to move by the thread on shaft 35 which engages with it.

Similarly by rotating the shaft 35 so as to retract the wedges 29 the tension on the bolts 20 and 21 is simultaneously relieved and the slidable part 12 released from forced frictional engagement with the ways 11, whereby it may be slid along the ways to another desired position.

Although I have illustrated and described a specific form of the invention, I am aware of the fact that modifications can be made therein by any person skilled in the art without departing from the scope of the invention as expressed in the claims. Therefore I do not wish to be limited to all the details of construction herein shown and described.

Having described my invention, what I claim as new and desire to secure by Letters Patent, is:

1. In a clamping device, the combination with a bed having ways, of a part slidable on said ways, a pair of saddles at opposite sides of said part, means for supporting said saddles to be free to tilt, means for holding the saddles down, preventing such tilting action, and equalizing the strains at opposite ends of said saddles, and means extending transversely across said part for simultaneously and equally applying force to both saddles to lift them to clamp said part to the bed.

2. In a clamping device for a head or tail stock, the combination with a bed having ways, of a part slidable on said ways, a pair of parallel saddles at opposite sides of said part, means for supporting said saddles to be free to tilt on an axis transverse to the direction in which said part slides, a pair of means located on opposite sides of the axis about which each saddle can tilt for holding the saddles down, preventing such tilting action after adjustment, and equalizing the strains at opposite ends of said saddles, and means extending transversely across said part for simultaneously and equally applying force to both saddles to lift them to clamp said part to the bed.

3. In a clamping device for a head or tail stock, the combination with a bed having ways and longitudinal undercut slots under them, of a part resting on and slidable along said ways, a pair of transverse wedges having convex upper surfaces oppositely inclined supported on opposite sides of said part, a pair of longitudinal saddles having central arches provided with oppositely inclined concave surfaces fitting on said convex surfaces of the wedges, whereby different downward pressures on the two ends of a saddle will be equalized in its application to hold said part down on the ways, bolts extending through the opposite ends of said saddles and having their heads in said undercut slots to hold the saddles down, and means for simultaneously moving said wedges equal distances in opposite directions to equalize the clamping pressure on both sides of said part.

4. In a clamping device, the combination with a bed having ways, of a part resting on and slidable along said ways, a pair of transverse wedges having convex upper surfaces oppositely inclined supported on opposite sides of said part, a pair of longitudinal saddles provided with oppositely inclined concave surfaces fitting on said convex surfaces of the wedges, bolts extending through the opposite ends of said saddles to hold the saddles down, and means for simultaneously moving said wedges equal distances in opposite directions.

5. In a clamping device for a head or tail stock, the combination with a bed having longitudinal ways, of a part slidable along the ways and resting thereon and having external ledges at opposite sides, a pair of lifting elements outside said part resting on said ledges and having upper surfaces curved about substantially transverse axes, a pair of longitudinal saddles having transverse concave recesses on their under sides fitting on and supported by said lifting elements, so that pressure applied to their opposite ends will be equalized and transmitted to the lifting elements, and means for positively and equally operating the lifting elements to apply an upward and equal pressure against the saddles at their centers and clamp said part down on the ways with an equal pressure on both sides.

6. In a clamping device for a head or tail stock, the combination with a bed having longitudinal ways, of a part slidable along the ways and resting thereon, a pair of lifting elements having upper surfaces curved about substantially transverse axes, a pair of saddles having concave recesses on their under sides supported by said lifting elements, so that pressure applied to their opposite ends will be equalized and transmitted to the lifting elements, and means for positively and equally operating the lifting elements to apply an upward and equal pressure against the saddles at their centers and clamp said part down on the ways with an equal pressure on both sides.

In testimony whereof I affix my signature, in the presence of two witnesses.

AUGUSTUS WOOD.

Witnesses:
MARMADUKE M. WILLS,
ERNEST L. FICKETT.